United States Patent [19]

Nishimura et al.

[11] Patent Number: 4,559,284
[45] Date of Patent: Dec. 17, 1985

[54] SECONDARY BATTERY

[75] Inventors: Shigeoki Nishimura, Katsuta; Kazunori Fujita, Ibaraki; Hiroyuki Sugimoto; Atsuko Tohyama, both of Hitachi; Noboru Ebato, Hitachi; Shinpei Matsuda, Ibaraki, all of Japan

[73] Assignees: Showa Denko K.K.; Hitachi, Ltd., both of Tokyo, Japan

[21] Appl. No.: 659,682

[22] Filed: Oct. 11, 1984

[30] Foreign Application Priority Data

Oct. 14, 1983 [JP] Japan ................... 58-190980

[51] Int. Cl.$^4$ .......................................... H01M 10/36
[52] U.S. Cl. .................................................... 429/213
[58] Field of Search ......................................... 429/213

[56] References Cited

U.S. PATENT DOCUMENTS 4,321,114  3/1982  MacDiarmid et al. ............. 429/213
4,442,187  4/1984  MacDiarmid et al. ............. 429/213

OTHER PUBLICATIONS

Ito et al., Simultaneous Polymerization and Formation of Polyacetylene Film on the Surface of Concentrated Soluble Ziegler-Type Catalyst Solution, pp. 10-21, Journal of Polymer Science, vol. 12, 11-20 (1974).

Primary Examiner—Donald L. Walton
Attorney, Agent, or Firm—Antonelli, Terry & Wands

[57] ABSTRACT

A secondary battery having at least one electrode made from a polymer having conjugated double bonds in a main chain such as polyacetylene can be improved remarkably in charge-discharge cycle life by making the electrode surface area of a negative electrode greater than that of a positive electrode.

9 Claims, 7 Drawing Figures

SECONDARY BATTERY

BACKGROUND OF THE INVENTION

This invention relates to a secondary battery having a long charge-discharge cycle life.

There have been known secondary batteries having one or two electrodes made from a polymer having conjugated double bonds in a main chain such as polyacetylene $[(CH)_x]$. (U.S. Pat. Nos. 4,321,114 and 4,442,187). This polymer works as an electrode active material and it can be used with conductive material such as carbon. But these batteries have a charge-discharge cycle life as short as 50 cycles, which is not sufficient for practical use. One reason for the short cycle life seems to be that a balance between doping an non-doping on the positive and the negative electrodes is lost. Further, these batteries have an initial coulombic efficiency of about 95%, which means that any side reactions are taking place.

SUMMARY OF THE INVENTION

It is an object of this invention to provide a secondary battery having a long charge-discharge cycle life.

This invention provides a secondary battery comprising a positive electrode, a negative electrode, and an electrolytic solution maintained between the electrodes, at least one of the electrodes being made from a polymer having conjugated double bonds in a main chain, the negative electrode being doped with a cation from the electrolyte, and the positive electrode being doped with an anion from the electrolyte, characterized in that the negative electrode has a larger electrode surface area than the positive electrode.

DESCRIPTION OF THE PREFERRED EMBODIMENTS

Figure 1:
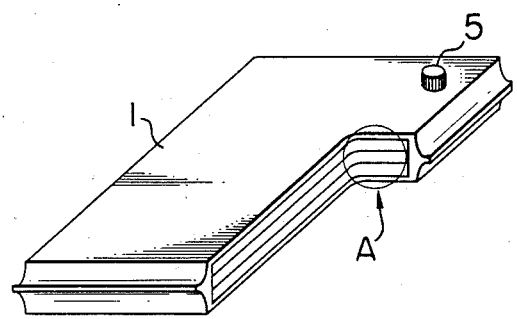
FIG. 1 is a perspective and partially cross-sectional view of a secondary battery of one embodiment of this invention.
Figure 2:
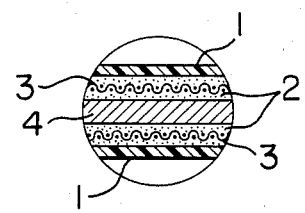
FIG. 2 is an enlarged cross-sectional view of the circle A in FIG. 1.

One embodiment of secondary batteries usable in this invention is explained referring to FIGS. 1 and 2. FIG. 1 is a perspective view with partially cross-sectional of a unit cell and FIG. 2 is an enlarged cross-sectional view of the circle A in FIG. 1. Numeral 1 denotes a casing, the outer surface of which is covered by a resin film laminated with a thin film (1-100 μm) of aluminum, since polyacetylene and doped polyacetylene are unstable for water and oxygen. Numeral 2 is an electrode which is made from, for example, polyacetylene and preferably has therein expanded metal or metal net 3 made of a corrosion-resistant material such as stainless steel, etc., in order to enhance a current collecting effect and to take out an electrode terminal 5. Numeral 4 is a separator in the form of fabric (woven or non-woven fabric) or foam made from a conventional material such as polypropylene, glass fibers, etc., to prevent short circuit between the electrodes and to maintain an electrolytic solution dissolving a dopant. It is possible to stack a number of such unit cells by using a proper electroconductive separator between unit cells so as to prevent transfer of the electrolytic solution between the unit cells.

When a direct current is flowed through electrodes, dopant ions are doped on the electrodes to give a positive electrode and a negative electrode.

According to this invention, the negative electrode should have a larger surface area than the positive electrode in order to maintain a balance of the positive and negative electrodes at the time of charge and discharge, and to make a difference in current density at the positive and negative electrodes.

Figure 4:
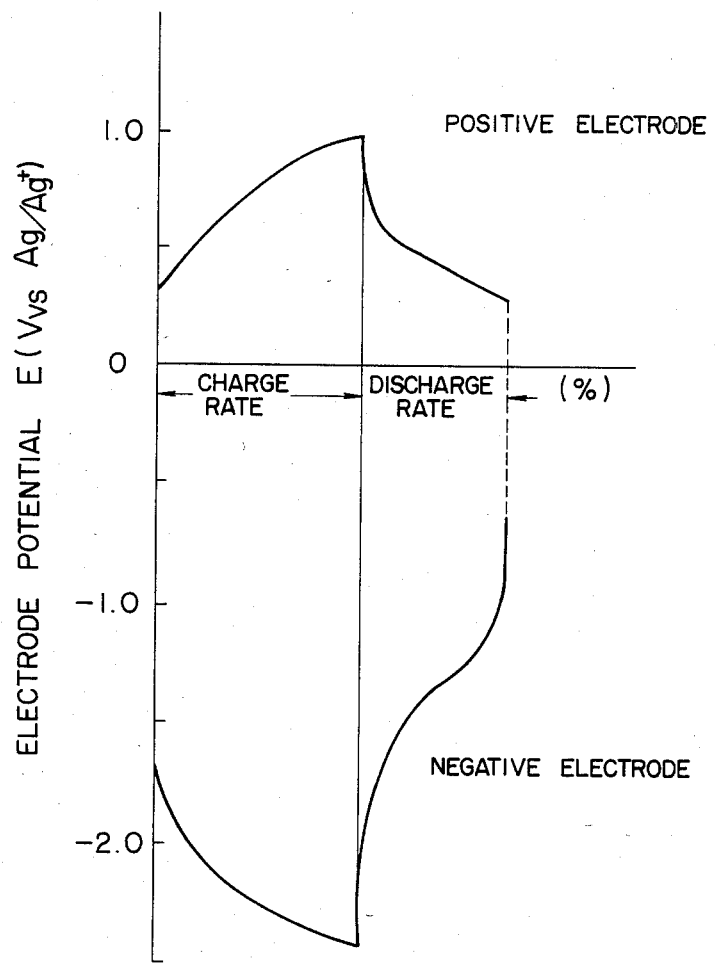
FIG. 4 is a graph showing changes of electrode potentials by charge and discharge.

A polymer having conjugated double bonds in a main chain, for example, polyacetylene $[(CH)_x]$ reduces a resistance value by doping of dopant ions to convert to a metallic state. But since the electrode has a thickness, a distribution of dopant ions is formed at the direction of the electrode thickness, which results in making it impossible to use the whole polyacetylene effectively. When the current density is lowered, this tendency can be improved. But when the current density is lowered, the electrode area should be made large; this is not suitable for practical use. The difference in diffusion speed of dopant ions due to the difference in current density is remarkable at the negative electrode. Changes of electrode potential at the time of charge and discharge when the current density at the positive and negative electrodes is constant are shown in FIG. 4. FIG. 4 is a graph showing a relationship between the charge rate (%), the discharge rate (%) and the electrode potential E (V vs. Ag/Ag+). FIG. 4 clearly shows that the discharge efficiency of the negative electrode is low. Therefore, it is necessary to lower the current density of only the negative electrode. In order to lower the current density of the negative electrode, it is preferable to make the electrode surface area of the negative electrode larger.

The term "electrode surface area" includes (a) a geometric opposite surface area (plate height × plate width of an electrode plate opposite to another electrode plate), (b) a gross geometric surface area (plate height × plate width × two surfaces of an electrode plate), (c) a specific surface area per unit weight of electrode active material, and (d) a total specific surface area obtained by multiplying the specific surface area per unit weight by the weight of the electrode active material.

Figure 5:
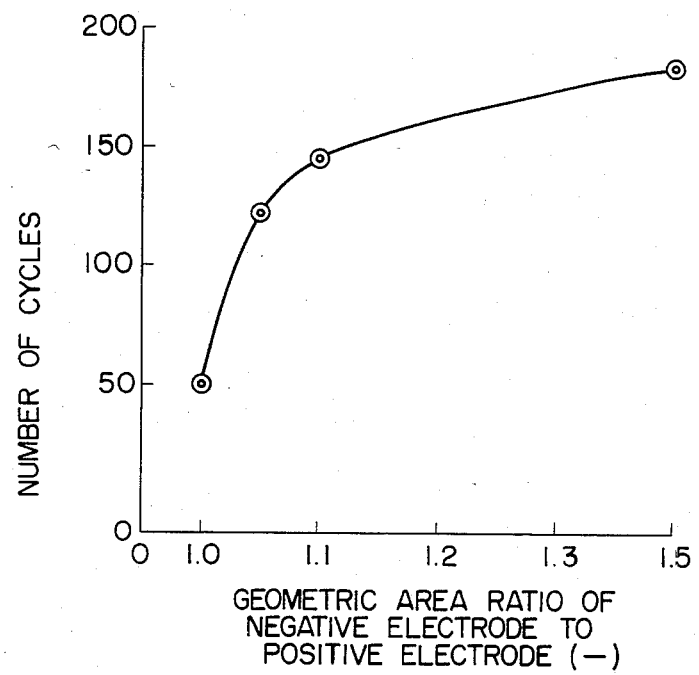
FIG. 5 is a graph showing a relationship between the charge-discharge cycle and the geometric area ratio of the negative electrode to the positive electrode.

In the case of the geometric surface area (a) and (b), the number of charge-discharge cycles increases with an increase of a ratio of the geometric surface area of the negative electrode to the geometric surface area of the positive electrode as shown in FIG. 5. In FIG. 5, the number of cycles means the number of charge-discharge cycles until the coulombic efficiency becomes lower than 50% at the doping level of 4 mole %. The coulombic efficiency is defined by the following equation:

$$\text{Coulombic efficiency} = \frac{\text{Electrical quantity flowed during discharge}}{\text{Electrical quantity supplied by charge}} \times 100$$

As is clear from FIG. 5, when the ratio of the negative electrode geometric surface area to the positive electrode geometric surface area increases to, for example, 1.5, the number of cycles does not increase in linear proportion to the increase of the geometric surface area ratio. Therefore, the negative electrode has a geometric surface area preferably 1.03 to 1.20 times (3 to 20% larger), more preferably 1.05 to 1.1 times (5 to 10% larger) as large as the geometric surface area of the positive electrode.

Figure 6:
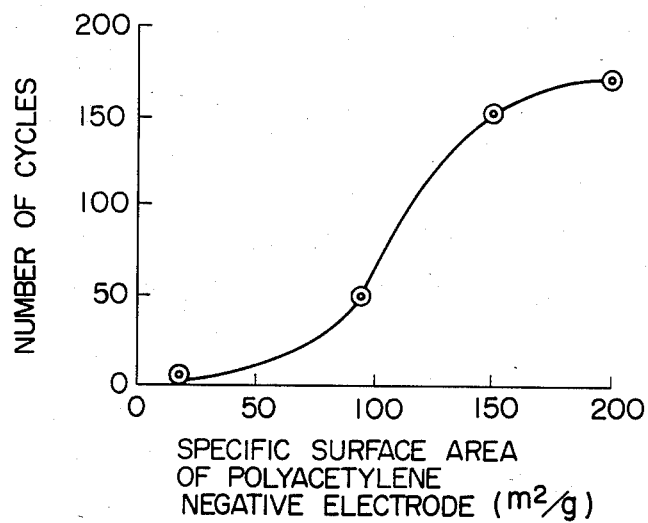
FIG. 6 is a graph showing a relationship between the charge-discharge cycle and the specific surface area of the negative electrode made from polyacetylene.

In the case of the specific surface area (c), the number of cycles changes with an increase of the specific surface area of negative electrode (e.g. polyacetylene) as shown in FIG. 6. In FIG. 6, an electrode made from polyacetylene having a specific surface area of 90 m²/g is used as the positive electrode and an electrode made from polyacetylene having a specific surface area of 20 to 200 m²/g is used as the negative electrode. The specific surface area is measured by a conventional method such as a BET method. As is clear from FIG. 6, the number of cycles maintaining 50% or more of coulombic efficiency at the doping level of 4 mole % is about 50% (a conventional value) when the negative electrode has the specific surface area of about 90 m²/g, while the number of cycles of 100 or more can be obtained when the specific surface area is 120 m²/g or more e.g. 200 m²/g or more. Therefore, it is preferable to use the negative electrode having the specific surface area as large as possible (e.g. 30% or more to 100% larger) compared with the specific surface area of the positive electrode.

Figure 7:
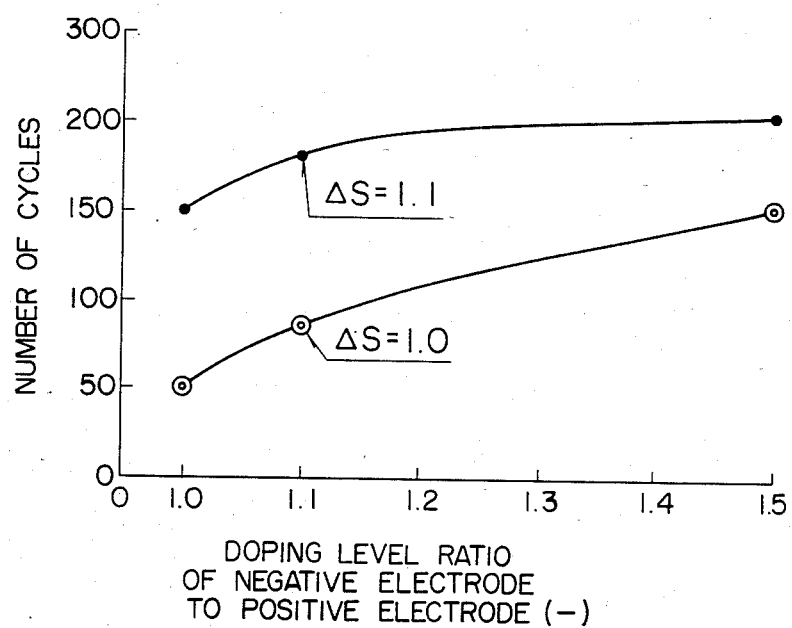
FIG. 7 is a graph showing a relationship between the charge-discharge cycle and the doping level ratio of the negative electrode to the positive electrode.

In the case of the total specific surface area (d), the number of cycles changes with an increase of a ratio of the doping level of negative electrode to the doping level of positive electrode (in negative value), that is, an increase of the weight of negative electrode (in other words, the total surface area) as shown in FIG. 7. In FIG. 7, the line

—O—O— shows the case wherein the ratio of negative electrode geometric surface area/positive electrode geometric surface area (ΔS)=1/1 and the line

— • — • — shows the case wherein the ratio of negative electrode geometric surface area/positive electrode geometric surface area (ΔS)=1.1/1. As is clear from FIG. 7, when the doping level of negative electrode is lowered and the electrode surface is enlarged, the number of charge discharge cycles increases. But considering the structure of battery, the lowering in the doping level at the negative electrode is preferably 20% or less compared with the doping level of positive electrode. That is, the total specific surface area of the negative electrode is preferably 20% or less and 5% or more larger than that of the positive electrode.

As the polymer having conjugated double bonds in a main chain, there can be used polyacetylene, polyphenylene, polythienylene, polypyrrole, polyaniline, and polythiophene alone or as a mixture thereof. Among them, polyparaphenylene, polyaniline and polyacetylene are preferable, and polyacetylene is more preferable. Polyacetylene can be obtained by a conventional process, for example, a process disclosed in J. Polymer Sci, Polymer Chemistry Edition, vol. 12, 11–20 (1974). Such a polymer can be used in the form of fibril.

As the negative electrode, there can be used that made from the polymer having conjugated double bonds in a main chain mentioned above or graphite. In such a case, the positive electrode can be made from the same or different polymer having conjugated double bonds in a main chain.

More concretely, in the case of forming the electrodes by using polyacetylene fibrils having the same structure (e.g. diameter) and the same bulk density when made into electrodes, the negative electrode is formed so as to make the geometric surface area larger than the positive electrode, since the doping of dopant ions to the polyacetylene takes place at the surfaces of polyacetylene fibrils (string-like form of crystalline polyacetylene having a diameter of about 200 Å). When polyacetylene having different bulk densities is used, the negative electrode is made from polyacetylene having a smaller bulk density (that is, having a larger specific surface area). When polyacetylene having different fibril diameters is used, the negative electrode is made from polyacetylene having a smaller fibril diameter so as to make the specific surface area of the electrode active material larger and to make the current density of the negative electrode substantially smaller than that of the positive electrode.

Dopant ions which can be electrochemically doped with the polymer having conjugated double bonds in a main chain such as polyacetylene include:

(i) halogenated anions of the elements in the Va group in the periodic table such as $PF_6^-$, $SbF_6^-$, $AsF_6^-$, $SbCl_6^-$, etc., (ii) halogenated anions of the elements in the IIIa group in the periodic table such as $BF_4^-$, etc., (iii) halogen anions such as $I^-(I_3^-)$, $Br^-$, $Cl^-$, etc., (iv) perchlorate anions such as $ClO_4^-$, (v) alkali metal ions such as $Li^+$, $Na^+$, $K^+$, and $Cs^+$, (vi) quaternary ammonium ions represented by the formula: $R_4N^+$, wherein R is a hydrocarbon group having 1 to 20 carbon atoms, and (vii) phosphonium ions represented by the formula: $R_4P^+$, wherein R is a hydrocarbon group having 1 to 20 carbon atoms. Examples of compounds (dopants) which can provide the dopant anions and dopant cations mentioned above are $LiPF_6$, $LiBF_4$, $LiClO_4$, $NaI$, $NaClO_4$, $KClO_4$, $(C_2H_5)_4NBF_4$, $(C_2H_5)_4NClO_4$, $(C_4H_9)_4NBF_4$, $(C_4H_9)_4NClO_4$, etc. These dopants can be used alone or as a mixture thereof.

An electrolytic solution used in this invention is obtained by dissolving the dopant mentioned above in water or non-aqueous solvent. The use of the non-aqueous solvent is preferable for secondary batteries. Examples of the non-aqueous solvent are ethers, ketones, nitriles, amines, amides, sulfur compounds, chlorinated hydrocarbons, esters, carbonates, nitro compounds, etc. Typical examples of the non-aqueous solvent are tetrahydrafuran, 2-methyltetrahydrofuran, 1,4-dioxane, monoglyme, acetonitrile, propionitrile, 1,2-dichloroethane, γ-butyrolactone, dimethoxyethane, methyl formate, propylene carbonate, dimethyl formamide dimethyl sulfoxide, dimethyl thioformamide, sulfolane, etc. These solvents can be used alone or as a mixture thereof.

The concentration of the electrolytic solution changes depending on the kind of electrolyte (dopant) and solvent, but is usually in the range of 0.001 to 10 mole/liter, more preferably 1 to 5 mol/liter.

The electrolytic solution can be impregnated in a separator such as non-woven fabric, etc., which is placed between the two electrodes.

The secondary battery according to this invention is well balanced in the positive and negative electrodes at the time of charge and discharge, and the charge-discharge cycle life is remarkably improved.

This invention is illustrated by way of the following Examples.

EXAMPLE 1

A secondary battery was constructed by using $(C_2H_5)_4NBF_4$ as a dopant, $CH_3CN$ as a solvent in a concentration of 1 mole/liter and electrodes made from polyacetylene. The gross geometric surface area of a negative electrode was made 10% larger than that of a positive electrode. The thickness of the negative electrode was 190 $\mu$m and that of the positive electrode was 200 $\mu$m. When the charge-discharge cycle properties were measured at doping level of 4 mole % with a current density of 5 mA/cm$^2$ against the positive electrode, the number of charge-discharge cycles maintaining the coulombic efficiency of 50% or more was 143.

EXAMPLE 2

A secondary battery was constructed in the same manner as described in Example 1 except that polyacetylene having the same gross geometric surface area and the same weight was used for forming electrodes but the specific surface area of a negative electrode was made 150 m$^2$/g and that of a positive electrode was made 90 m$^2$/g. The coulombic efficiency at an initial stage was 99.9%. When the charge-discharge cycle properties were measured in the same manner as described in Example 1, the number of charge-discharge cycles maintaining the coulombic efficiency of 50% or more was 153.

EXAMPLE 3

A secondary battery was constructed in the same manner as described in Example 2 except that the gross geometric surface area of the negative electrode was made 10% larger than that of the positive electrode. The number of charge-discharge cycles maintaining the coulombic efficiency of 50% or more was 164. The cycle life was thus prolonged.

EXAMPLE 4

A secondary battery was constructed in the same manner as described in Example 1 except that the weight of a negative electrode was made 10% larger than that of a positive electrode. That is, the total specific surface area of the negative electrode was increased in 10%. The number of charge-discharge cycles maintaining the coulombic efficiency of 50% or more was 172.

EXAMPLE 5

A secondary battery was constructed in the same manner as described in Example 1 except that the weight of a negative electrode was made 50% larger than that of a positive electrode. The number of charge-discharge cycles maintaining the coulombic efficiency of 50% or more was 201.

EXAMPLE 6

A secondary battery was constructed in the same manner as described in Example 3 except that the weight of a negative electrode was made 10% larger than that of a positive electrode. The number of charge-discharge cycles maintaining the coulombic efficiency of 50% or more was 176.

COMPARATIVE EXAMPLE

Figure 3:
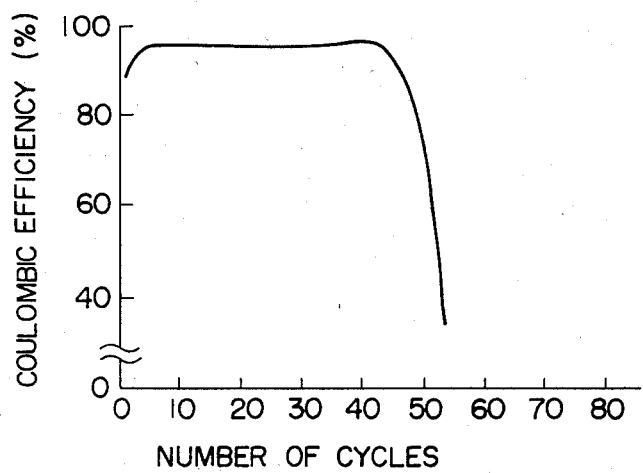
FIG. 3 is a graph showing a relationship between the coulombic efficiency and the number of charge-discharge cycles according to prior art.

A secondary battery was constructed by using $(C_2H_5)_4NBF_4$ as a dopant, $CH_3CN$ as a solvent in a concentration of 1.0 mole/liter and two electrodes made from polyacetylene and having a thickness of 200 $\mu$m with the same gross geometric surface area. The relationship between the coulombic efficiency and the number of charge-discharge cycles was as shown in FIG. 3. The number of charge-discharge cycles measured in the same manner as described in Example 1 was about 50.

What is claimed is:

1. In a secondary battery comprising a positive electrode, a negative electrode, and an electrolyte maintained between the electrodes, the electrodes each being made from a polymer having conjugated double bonds in a main chain, the negative electrode being doped with a cation from the electrolyte and the positive electrode being doped with an anion from the electrolyte, the improvement wherein the negative electrode has a larger electrode surface area than the positive electrode.

2. A secondary battery according to claim 1, wherein the polymer is polyacetylene, polyparaphenylene or polyaniline.

3. A secondary battery according to claim 1, wherein the negative electrode has a larger electrode surface area than the positive electrode in terms of a geometric opposite surface area.

4. A secondary battery according to claim 1, wherein the negative electrode has a larger electrode surface area than the positive electrode in terms of a gross geometric surface area.

5. A secondary battery according to claim 1, wherein the negative electrode has a 3 to 20% larger electrode surface area than the positive electrode in terms of a geometric opposite surface area or a gross geometric surface area.

6. A secondary battery according to claim 1, wherein the negative electrode has a larger electrode surface area than the positive electrode in terms of a specific surface area per unit weight of electrode active material.

7. A secondary battery according to claim 6, wherein the specific surface area of the negative electrode is 30% or more larger than that of the positive electrode.

8. A secondary battery according to claim 1, wherein the negative electrode has a larger electrode surface area than the positive electrode in terms of a total specific surface area.

9. A secondary battery according to claim 8, wherein the total specific surface area of the negative electrode is 20% or less larger than that of the positive electrode.

* * * * *